(12) United States Patent
Kesler et al.

(10) Patent No.: US 9,037,320 B1
(45) Date of Patent: May 19, 2015

(54) UNSCHEDULED MAINTENANCE DISRUPTION SEVERITY AND FLIGHT DECISION SYSTEM AND METHOD

(71) Applicant: The Boeing Company, Chicago, IL (US)

(72) Inventors: Paul Kesler, Jacksonville, FL (US); Kevin Arrow, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/167,864

(22) Filed: Jan. 29, 2014

(51) Int. Cl.
*B64D 45/00* (2006.01)
*B64F 5/00* (2006.01)

(52) U.S. Cl.
CPC .............. *B64D 45/00* (2013.01); *B64F 5/0045* (2013.01)

(58) Field of Classification Search
USPC ........................................................... 701/14
See application file for complete search history.

(56) References Cited

U.S. PATENT DOCUMENTS

| | | | |
|---|---|---|---|
| 5,974,349 A * | 10/1999 | Levine | 701/29.6 |
| 7,209,814 B2 * | 4/2007 | Kipersztok et al. | 701/31.6 |
| 7,230,527 B2 * | 6/2007 | Basu et al. | 340/506 |
| 7,565,331 B2 * | 7/2009 | Cutler et al. | 705/400 |
| 2003/0167111 A1 * | 9/2003 | Kipersztok et al. | 701/29 |
| 2007/0113281 A1 * | 5/2007 | Leach | 726/22 |
| 2007/0219833 A1 * | 9/2007 | Trautman | 705/5 |
| 2008/0010004 A1 * | 1/2008 | Small et al. | 701/120 |
| 2008/0010005 A1 * | 1/2008 | Small et al. | 701/120 |
| 2008/0046167 A1 * | 2/2008 | Small et al. | 701/120 |

OTHER PUBLICATIONS

Boeing, The Boeing Edge, Airplane Health Management, http://www.boeing.com/boeing/commercial/aviationservices/information-services/real-time-operations/ahm.page, Retrieved Jan. 29, 2014.
Jeppesen, A Boeing Company, Jeppesen Fleet Tracking, http://ww1.jeppesen.com/industry-solutions/aviation/commercial/carmen-fleet-control.jsp, Retrieved Jan. 29, 2014.
AeroInfo, A Boeing Company, Systems Integration, http://www.aeroinfo.com/aeroinfo-services/systems-integration.aspx, Retrieved Jan. 29, 2014.
AeroInfo, A Boeing Company, Solutions Delivery, http://www.aeroinfo.com/aeroinfo-services/solutions-delivery.aspx, Retrieved Jan. 29, 2014.
Trax Maintenance and Engineering, Fleet Management Software, http://www.trax.aero/product.php, Retrieved Jan. 29, 2014.
Swiss Aviation Software, Maintenance Control, Managing The Operations, http://www.swiss-as.com/modules.do?modID=25, Retrieved Jan. 29, 2014.

(Continued)

*Primary Examiner* — Thomas Tarcza
*Assistant Examiner* — Alex C Dunn
(74) *Attorney, Agent, or Firm* — Kunzler Law Group, PC (57) ABSTRACT

Described herein is an apparatus that includes a disruption severity module and flight recommendation module. The disruption severity module calculates a disruption severity index value associated with an unscheduled maintenance event of an aircraft. The disruption severity index value is calculated based on a plurality of flight operation factors affected by the unscheduled maintenance event. The flight recommendation module recommends one of resolving the unscheduled maintenance event of the aircraft before a subsequent flight of the aircraft or flying the aircraft without resolving the unscheduled maintenance event of the aircraft based on the disruption severity index value.

30 Claims, 7 Drawing Sheets

(56) References Cited

OTHER PUBLICATIONS

Swiss Aviation Software, Planning, The Hub of the System, http://www.swiss-as.com/modules.do?modID=23, Retrieved Jan. 29, 2014.

Sabre Airline Solutions, Technology That Sets You Free, http://www.sabreairlinesolutions.com/home/software_solutions/technology, Retrieved Jan. 29, 2014.

* cited by examiner

Display
112

| Plane | Component | Location | SI | Recommendation |
|---|---|---|---|---|
| B-123 | Fuel Pump | Station 1 | 2.85 | Fly |
| B-456 | Brake Valve | Station 2 | 2.64 | Repair |

| Parameters | Value |
|---|---|
| 1 | .3 |
| 2 | .7 |
| 3 | .9 |
| 4 | .24 |
| 5 | .5 |

Historic SI: 2.35
Historic Delay: 52 min

| Plane | Component | Location | SI | Recommendation |
|---|---|---|---|---|
| B-789 | Gasket | Bay 1 | 1.90 | Repair |
| B-012 | Rudder | Station 3 | 1.85 | Fly |
| B-621 | Seat Fastener | Bay 2 | 1.77 | Fly |
|  |  |  |  |  |
|  |  |  |  |  |

UNSCHEDULED MAINTENANCE DISRUPTION SEVERITY AND FLIGHT DECISION SYSTEM AND METHOD

FIELD

This disclosure relates to the maintenance of aircraft, and more particularly to managing unscheduled maintenance events of aircraft.

BACKGROUND

There are many systems and methods for managing the flight schedules of aircraft. Many systems configure a flight schedule that includes multiple flights of a single aircraft per day. Often, flight scheduling systems take into account the scheduled maintenance of an aircraft, and other expected events, when configuring a flight schedule. Should unexpected delays (e.g., weather delays, flight crew delays, passenger disruptions, maintenance delays, and the like) occur, these systems can adjust the flight schedule of an aircraft in view of the delays.

Likewise, there are many systems and methods for managing the maintenance of aircraft. These systems can schedule routine periodic maintenance events for an aircraft. Additionally, conventional maintenance management systems may be able to accommodate an unexpected maintenance event occurring on an aircraft by coordinating maintenance resources on the ground to repair the fault associated with the unexpected maintenance event.

Some conventional systems have been designed to collect data relating to a wide range of operational aspects of running an airline, including booking, scheduling, maintaining, and operating an aircraft. Based on the collected historical data, the systems are configured to suggest or implement actions that improve the operational aspects of running the airline.

SUMMARY

The subject matter of the present disclosure has been developed in response to the present state of the art, and in particular, in response to the limitations of conventional standalone systems for scheduling flights and maintaining aircraft, respectively. Specifically, although some conventional flight management information technology systems may manage flight scheduling, these systems do not simultaneously manage the ongoing maintenance activities of the aircraft or maintenance capabilities of airports when accommodating unscheduled maintenance events on the aircraft. Furthermore, although some conventional maintenance management information technology systems may manage unscheduled maintenance events on an aircraft, these systems do not consider the flight schedule of the aircraft when accommodating the unscheduled maintenance events. In other words, there are no conventional systems that take into account both the flight schedule and maintenance schedule of an aircraft to manage unscheduled maintenance events on the aircraft in an efficient and cost-effective manner. Similarly, conventional systems do not calculate and utilize the disruption severity of an unscheduled maintenance event when coordinating the repair of faults associated with the unscheduled maintenance event. Accordingly, the subject matter of the present disclosure has been developed to provide an apparatus, system, and method for managing unscheduled maintenance events of aircraft that overcome at least some of the above-discussed shortcomings of the prior art.

According to one embodiment, an apparatus includes a disruption severity module and flight recommendation module. The disruption severity module calculates a disruption severity index value associated with an unscheduled maintenance event of an aircraft. The disruption severity index value is calculated based on a plurality of flight operation factors affected by the unscheduled maintenance event. The flight recommendation module recommends one of resolving the unscheduled maintenance event of the aircraft before a subsequent flight of the aircraft or flying the aircraft without resolving the unscheduled maintenance event of the aircraft based on the disruption severity index value. In certain implementations, each of the plurality of flight operation factors includes a selected one of at least two parameters. Each parameter can be associated with a different selection index value, and the disruption severity index value can include an aggregation of the selection index values of the selected parameters.

In some implementations of the apparatus, the selection index values for the at least two parameters of at least one flight operation factor are determined based on predetermined business rules. According to certain implementations, the selected one of the at least two parameters of at least one flight operation factor is selected based on historical data for at least one previous unscheduled maintenance event corresponding with the unscheduled maintenance event. In yet some implementations, the selected one of the at least two parameters of the at least one flight operation factor is selected based on real-time data received from an aircraft flight schedule module. According to certain implementations, the selected one of the at least two parameters of the at least one flight operation factor is selected based on real-time data received from a maintenance management module. Further, the selected one of the at least two parameters of the at least one flight operation factor can be selected based on real-time data received from external data sources.

According to certain implementations of the apparatus, the plurality of flight operation factors includes a type-of-delay factor. The at least two parameters of the type-of-delay factor includes an at-gate delay, a return-to-gate delay, and an in-flight diversion delay. The at-gate delay can be associated with a first selection index value, the return-to-gate delay can be associated with a second selection index value greater than the first selection index value, and the in-flight diversion delay can be associated with a third selection index value greater than the second selection index value.

In some implementations of the apparatus, the plurality of flight operation factors includes a delay duration factor. The at least two parameters of the delay duration factor include a plurality of different time periods, where the selection index value for a shorter time period is lower than the selection index value for a longer time period.

According to one implementation of the apparatus, the plurality of flight operation factors comprises an aircraft-on-ground (AOG) factor. The at least two parameters of the AOG factor include grounded and flyable.

In yet another implementation of the apparatus, the plurality of flight operation factors includes a missed flight factor. The at least two parameters of the missed flight factor can include missed flights and no missed flights. The selection index value for missed flights can be based on a quantity of missed flights multiplied by an index value constant.

According to one implementation of the apparatus, the plurality of flight operation factors includes an aircraft ferry factor.

In some implementations of the apparatus, the flight recommendation module recommends one of resolving the unscheduled maintenance event of the aircraft before a subsequent flight of the aircraft or flying the aircraft without resolving the unscheduled maintenance event of the aircraft based on real-time data received from an aircraft flight schedule module. The real-time data may include data associated with a current location of the aircraft with the unscheduled maintenance. The real-time data can also or alternatively include data associated with the time-of-day of a scheduled flight.

According to certain implementations of the apparatus, the flight recommendation module recommends one of resolving the unscheduled maintenance event of the aircraft before a subsequent flight of the aircraft or flying the aircraft without resolving the unscheduled maintenance event of the aircraft based on real-time data received from a maintenance management module. The real-time data may include data associated with at least one scheduled maintenance event of the aircraft. The real-time data may also or alternatively include data associated with maintenance capability at one or more aircraft landing stations.

In yet some implementations of the apparatus, the flight recommendation module recommends one of resolving the unscheduled maintenance event of the aircraft before a subsequent flight of the aircraft or flying the aircraft without resolving the unscheduled maintenance event of the aircraft based on a predicted effectiveness of the resolution of the unscheduled maintenance event. According to certain implementations, the flight recommendation module recommends one of resolving the unscheduled maintenance event of the aircraft before a subsequent flight of the aircraft or flying the aircraft without resolving the unscheduled maintenance event of the aircraft based on a comparison between the disruption severity index value associated with the unscheduled maintenance event and a historical disruption severity index value associated with previous unscheduled maintenance events at least similar to the unscheduled maintenance event. The flight recommendation module can include a priority module that is configured to prioritize the timing of resolving multiple unscheduled maintenance events for multiple aircraft based at least partially on the disruption severity index values associated with the unscheduled maintenance events and impacts of resolving each multiple unscheduled maintenance event on a flight schedule.

According to some implementations, the apparatus further includes a display module configured to display data associated with the unscheduled maintenance event. The data can include at least one of the disruption severity index and a recommendation to either resolve the unscheduled maintenance event before a subsequent flight of the aircraft or fly the aircraft without resolving the unscheduled maintenance event.

In certain implementations, the flight recommendation module recommends one of resolving the unscheduled maintenance event of the aircraft before a subsequent flight of the aircraft or flying the aircraft without resolving the unscheduled maintenance event of the aircraft based on where the aircraft will be in the future. Further, the plurality of flight operation factors may include at least one of a load factor, missed flights value factor, hub factor, missed connections percentage factor, network delay factor, time-of-day factor, and pilot/crew delay factor.

According to another embodiment, a system for managing unscheduled maintenance events of aircraft includes a flight schedule module that monitors current locations and flight schedules of aircraft. The system also includes a maintenance module that monitors current maintenance schedules of aircraft and maintenance capabilities of aircraft landing stations. Also, the system includes a disruption control module that calculates a disruption severity index value of an unscheduled maintenance event of an aircraft, and sets a fix-or-fly status of the aircraft based on the disruption severity index, the current location and flight schedule of the aircraft, the current maintenance schedule of the aircraft, and the capabilities of aircraft landing stations on the flight schedule of the aircraft.

In yet another embodiment, a method for managing unscheduled maintenance events of aircraft includes receiving a current flight schedule for an aircraft, receiving a current maintenance schedule for the aircraft, and receiving current maintenance capabilities of aircraft landing stations on the current flight schedule. The method further includes calculating a disruption severity index value associated with an unscheduled maintenance event of the aircraft based on a plurality of flight operation factors affected by the unscheduled maintenance event. Additionally, the method includes recommending fixing the unscheduled maintenance event before flying the aircraft or flying the aircraft before fixing the unscheduled maintenance event based on the disruption severity index value, the current flight schedule for the aircraft, the current maintenance schedule for the aircraft, and the current maintenance capabilities of the aircraft landing stations on the current flight schedule.

According to some implementations, the method also includes adjusting at least one of the current flight schedule and current maintenance schedule if fixing the unscheduled maintenance event before flying the aircraft is recommended. Additionally, the method can include adjusting the current maintenance schedule if flying the aircraft before fixing the unscheduled maintenance event is recommended.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
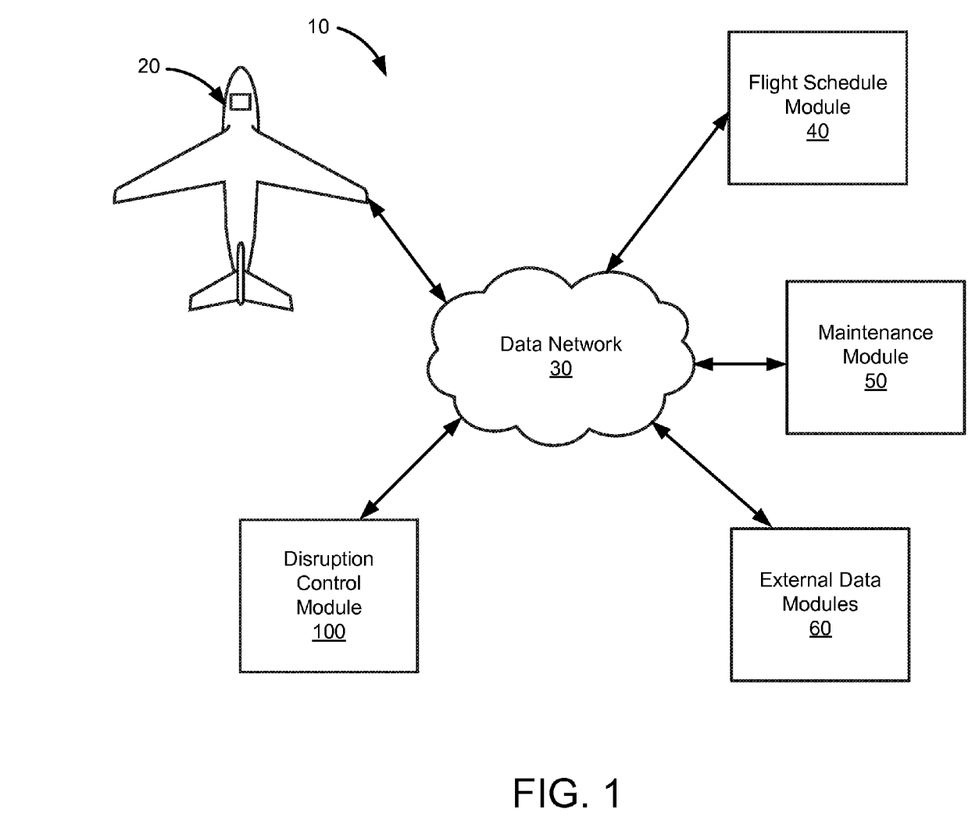
FIG. 1 is a schematic view of an aircraft management system according to one embodiment.

Referring to FIG. 1, one embodiment of a system 10 for managing an aircraft 20 is shown. The system 10 includes a data network 30 and several modules that communicate with each other and the aircraft 20 over the data network. More specifically, the system 10 includes a flight schedule module 40, a maintenance module 50, external data modules 60, and a disruption control module 100 each capable of communication with the data network 30. Accordingly, in some embodiments, the aircraft 20 and modules 40, 50, 60, 100 may receive communications from and transmit communications to the data network 30. Generally, the system 10 is configured to manage the flights and maintenance of the aircraft 20.

The data network 30, in certain embodiments, transmits digital communications between the aircraft 20 and one or more modules 40, 50, 60, 100, and/or between two or more modules. The data network 30 can be a wireless network, such as a wireless telephone network, a local wireless network, such as a Wi-Fi network, a Bluetooth® network, and the like. Similarly, the data network 30 can include other wireless-type communications, such as optical communications (e.g., laser and infrared) and electromagnetically-generated communications (e.g., radio waves). The data network 30, in another embodiment, includes a wide area network ("WAN"), a storage area network ("SAN"), a local area network ("LAN"), an optical fiber network, the internet, or other data network known in the art. The data network 30 can include two or more networks. In a further embodiment, the data network 30 includes one or more servers, routers, switches, and/or other networking equipment. The data network 30 can include computer readable storage media, such as a hard disk drive, a mass storage unit, an optical drive, non-volatile memory, random access memory ("RAM"), or the like. In certain embodiments, the data network 30 is two physically separate data networks such one data network is coupled to one or more of the aircraft 20 and modules 40, 50, 60, 100, and another data network is coupled to the other of the aircraft and modules.

Figure 2:
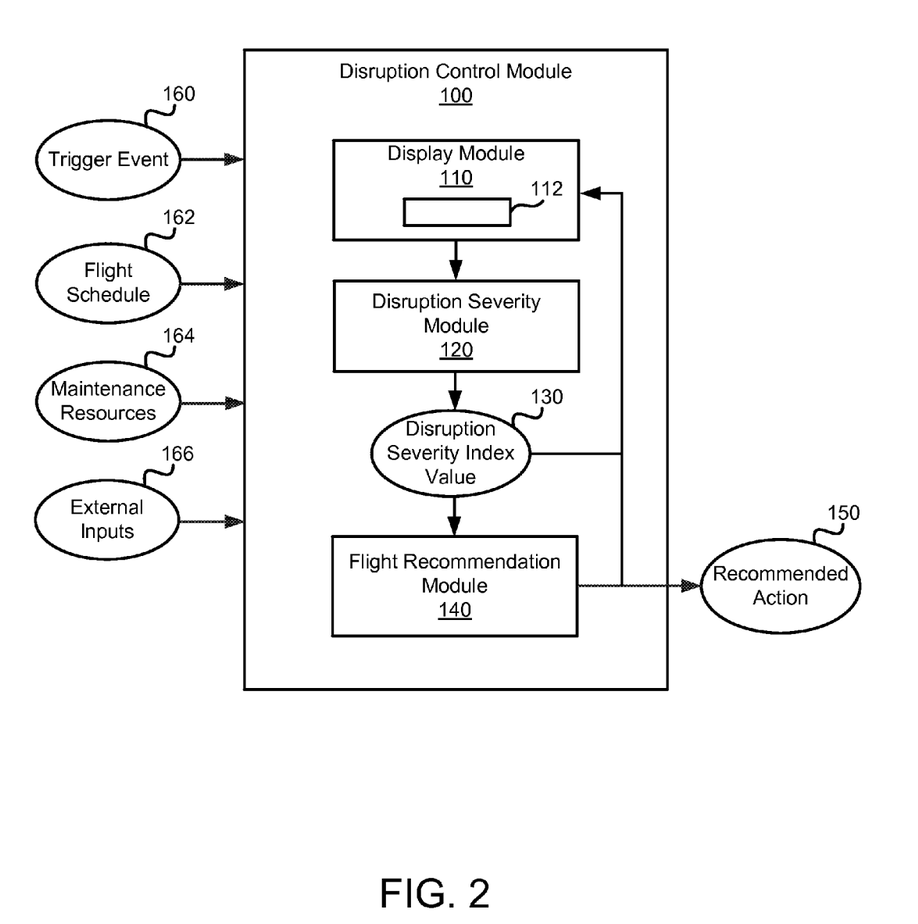
FIG. 2 is a schematic block diagram of a disruption control module according to one embodiment.

As shown in FIG. 2, the disruption control module 100 includes a display module 110, disruption severity module 120, and a flight recommendation module 140. Generally, the disruption control module 100 receives various inputs, and based on one or more of those inputs, generates a recommended action 150 for addressing an unscheduled maintenance event on the aircraft 20. According to some implementations, the inputs may include one or more of a trigger event 160, a flight schedule 162, maintenance resources 164, and external inputs 166. The trigger event 160 is issued when a fault (e.g., malfunction of a component or system) on the aircraft 20 has triggered an unscheduled maintenance event. Accordingly, an unscheduled maintenance event is associated with a particular fault on the aircraft being triggered. In some instances, an unscheduled maintenance event is defined as the fault with which it is associated. The fault can be triggered during a flight of the aircraft 20 and communicated from the aircraft to the disruption control module 100 via the data network 30. In yet some implementations, the fault can be triggering while the aircraft 20 is on the ground and communicated to the disruption control module 100 in the same manner. In certain embodiments, the recommended action 150 includes one of (1) fixing a fault triggering the unscheduled maintenance event before the next flight of the aircraft 20; or (2) delaying the fixing of the fault triggering the unscheduled maintenance event until after completion of the next flight, and potentially other subsequent flight(s). In this manner, the recommended action 150 can be a fix or fly recommendation.

The display module 110 includes and is configured to control a display 112. The display 112 can include a graphical user interface for receiving input from a user and/or provide visual representations of data associated with various aspects of unscheduled maintenance events, including the management of such events. Further details of the display module 110 and display 112 will be provided below.

Figure 3:
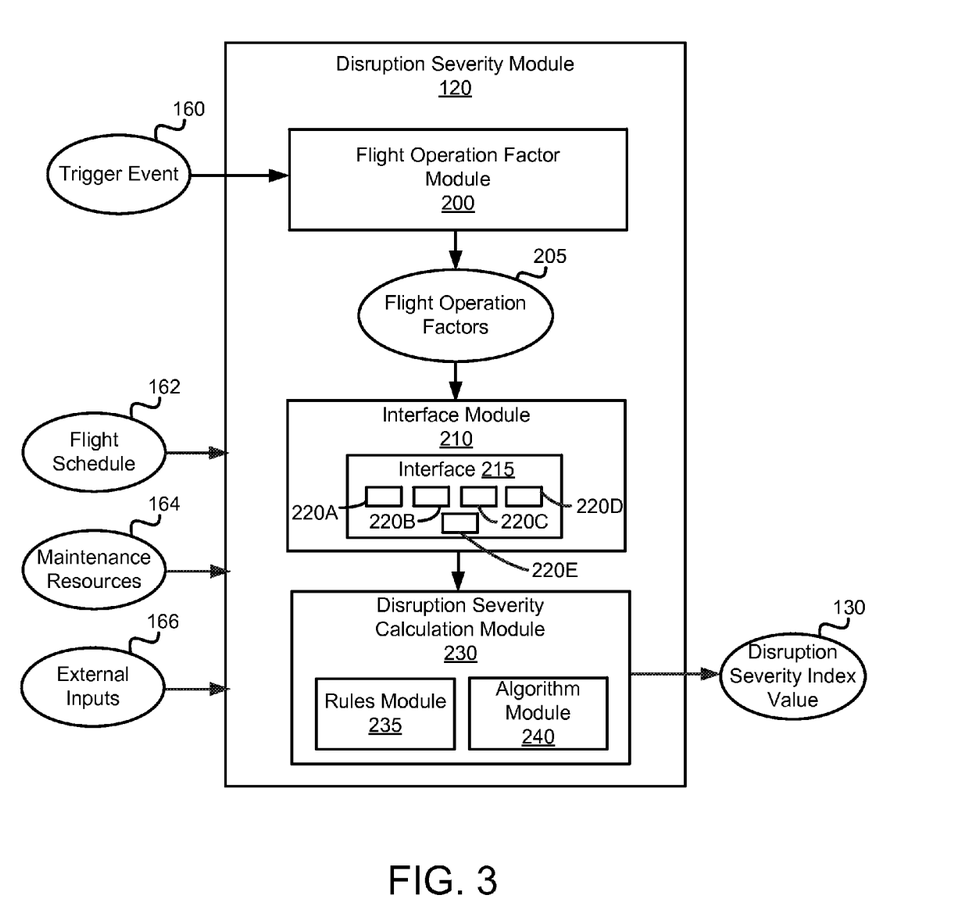
FIG. 3 is a schematic block diagram of a disruption severity module according to one embodiment.

Referring to FIG. 3, the disruption severity module 120 is configured to determine (e.g., calculate) a disruption severity index value 130 based on one or more of the trigger event 160, flight schedule 162, maintenance resources 164, and external inputs 166. After receiving the trigger event 160, which indicates that an unscheduled maintenance event for a particular aircraft 20 has occurred, a flight operation factor module 200 of the disruption severity module 120 determines one or more flight operation factors 205. Generally, a flight operation factor is a factor that affects flight operations of aircraft and is affected by an unscheduled maintenance event. In one embodiment, the flight operation factor module 200 selects one or more predetermined flight operation factors 205 based on the type of unscheduled maintenance event associated with the trigger event 160. In certain implementations, the flight operation factors are the same for all unscheduled maintenance events regardless of fault type. However, according to some implementations, the flight operation factors affected by one unscheduled maintenance event (e.g., associated with a first fault type) may be different than the flight operation factors affected by another different unscheduled maintenance event (e.g., associated with a second fault type). In one exemplary embodiment, the flight operation factor module 200 determines a plurality of flight operation factors 205 in response to the trigger event 160. In some embodiments, the flight operation factors 205 are selected by the flight operation factor module 200 based on user preferences, industry standards, historical values, and/or the like. In one implementation, the flight operation factors 205 are based on business rules or preferences of the service provider (e.g., airline) that is servicing the aircraft. Accordingly, if a particular service provider considers certain flight operation factors 205 to be particularly relevant to its ability to efficiently manage flight operations, but another service provider does not, the former service provider may desire consideration of different flight operation factors 205 in determining the disruption severity index value 130 compared to the latter.

Although any of various additional flight operation factors, or fewer flight operation factors, can be used, in one exemplary implementation, the flight operation factors 205 determined by the flight operation factor module 200 include a type-of-delay (TOD) factor, a delay duration factor, an aircraft-on-ground (AOG) factor, a missed flight factor, and an aircraft ferry factor.

The TOD factor represents the action performed on an aircraft experiencing an unscheduled maintenance event based on the current location of the aircraft when the unscheduled maintenance event occurred. For example, if the aircraft is on the ground at an assigned gate of an aircraft landing station (e.g., airport) when the unscheduled maintenance event occurred, then no immediate relocation of the aircraft is performed and the action can be considered a first or minor delay type. In contrast, if the aircraft is on the ground but is taxing away from the gate when the unscheduled maintenance event occurred, then the aircraft may need to return to the gate, and the action can be considered a second or intermediate delay type. Still further, if the aircraft is in flight when the unscheduled maintenance event occurred, then the aircraft may need to be diverted to another aircraft landing station, and the action can be considered a third or major delay type. Although three delay types for the TOD factor have been discussed, other or additional delay types may be considered.

The delay duration factor represents the time delay to resolve or fix the unscheduled maintenance event (e.g., the fault or defective component associated with the event).

The AOG factor represents the ability of the aircraft to fly without resolving the unscheduled maintenance event. In other words, the AOG factor is tied to whether the aircraft must be fixed before it can fly.

The missed flight factor represents missed future flights on the aircraft's flight schedule should time be taken to repair the unscheduled maintenance event.

The aircraft ferry factor represents the need for an additional aircraft to be ferried in to replace in the flight schedule the aircraft with the unscheduled maintenance event.

Each flight operation factor 205 is characterized by one of at least two parameters or subset characteristics. The parameters of a given flight operation factor 205 represent the different attributes, ranges, boundaries, qualities, and/or the like of the flight operation factor. Furthermore, each of the parameters of a flight operation factor 205 can be quantified by a different selection index value. The selection index values for the parameters of a given flight operation factor 205 vary based on the severity or level of disruption of flight operations associated with the parameters. For example, for a given flight operation factor, one possible parameter may have a minor impact on the disruption of flight operations and thus may have a relatively low selection index value. In contrast, another possible parameter may have a major impact on the disruption of flight operations and thus may have a relative high selection index value. The selection index values assigned to the parameters of the flight operation factor 205 can be based on user preferences, industry standards, historical values, and/or the like. In one implementation, the selection index values are based on business rules or preferences of the service provider (e.g., airline) that is servicing the aircraft. Accordingly, if a particular service provider considers certain parameters of the flight operation factors 205 to be particularly disruptive to its flight operations, but another service provider does not, the former service provider may assign a higher selection index value to the parameters than the latter. In this manner, the flight operation factors 205 can be weighted according to preferences of the service provider.

The disruption severity module 120 calculates the disruption severity index value 130 as a function of selected parameters for each flight operation factor 205. In some implementations, the function of selected parameters combines (e.g., aggregates) the selection index values associated with the selected parameters using any of various mathematical operations and techniques. In one particular implementation, the disruption severity index value 130 is equal to a summation (e.g., weighted summation) of the selection index values associated with the selected parameters. Although the function of selected parameters for calculating the disruption severity index value 130 can be based on any of a plurality of flight operation parameters, according to one implementation, for example, the disruption severity index (DSI) value 130 is calculated as a function of selected parameters according to $$DSI = f(TOD, DD, AOG, MF, AF, MF, LF, VF, HF, CF, NF, RF, PF) \quad (1)$$

where DD is the delay duration factor, MF is the missed flight factor, AF is the aircraft ferry factor, LF is a load factor, VF is a missed flights value factor, HF is a hub factor, CF is a missed connections percentage factor, NF is a network delay factor, RF is a time-of-day factor, and PF is a pilot/crew factor. The load factor represents the highest load of any missed flights. The missed flights value factor represents whether any missed flights due to repairing an unscheduled maintenance event are network-designated, high-value flights. The hub factor represents whether any missed flights due to repairing an unscheduled maintenance event are inbound flights to a network hub. The missed connections percentage factor represents the percentage of passengers on an aircraft with an unscheduled maintenance event that will experience a missed connection at a hub should the unscheduled maintenance event be repaired. The network delay factor represents the total delay already in an enterprise network when the unscheduled maintenance event occurs. The time-of-day factor represents the timing of a repair of an unscheduled maintenance event relative to the beginning of a network's start-of-fly day. The pilot/crew factor represents the number of delayed flights as a result of the pilot and crew of an aircraft having an unscheduled maintenance event under repair being delayed. Of course, any one or more of the above factors of Equation 1 can be omitted or replaced with another factor or other factors, or additional factors can be considered in Equation 1.

Incorporating exemplary parameters for each factor and exemplary selection index values for each parameter into Equation 1, the DSI value 130 can be determined. The quantity and ranges of the possible parameters and associated selection index values for each factor of Equation 1 can vary as desired.

After the flight operation factors 205 are selected by the flight operation factor module 200, the disruption severity calculation module 230 includes an algorithm module 240 that applies the selected parameters of the flight operation factors 205 to a disruption severity index value equation or algorithm, which can be the same as or similar to Equation 1, to calculate the disruption severity index value 130. In some embodiments, the parameters of the flight operation factors 205 are selected manually, and in other embodiments, the parameters of the flight operation factors are selected automatically based on predetermined preferences.

According to embodiments employing manual selection of the parameters of the flight operation factors 205, the disruption severity module 120 includes an interface module 210. The interface module 210 includes an interface 215, which can be a graphical user interface of the display 112 in some implementations. The interface 215 includes a plurality of data entry fields 220A-E for receiving user selections. Each data entry field 220A-E can correspond with a respective one of the flight operation factors 205. Furthermore, each data entry field 220A-E may display, or offer as a selection, the parameters associated with a respective flight operation factor. For example, one of the data entry fields 220A-E may correspond with the delay duration factor, and display and offer for selection a plurality of delay duration parameters and selection index values. A user may manually select the parameters of the flight operation factors 205 based any of various preferences and information, including known historical data, past experience, business rules, and the like.

In embodiments employing automatic selection of the parameters of the flight operation factors 205, the disruption severity calculation module 230 includes a rules module 235. The rules module 235 includes rules that govern which parameters of each flight operation factor are selected. The rules are based on various factors, such as business preferences, historical data, current flight schedules, maintenance resources, and the like. The business preferences and historical data may come as input from the external inputs 166, the current flight schedules may come as input from the flight schedule 162, and the maintenance resources may come as input from the maintenance resources 164. For example, the preferences selected for the TOD factor and missed flight factor may be based on the current location and flight schedule of an aircraft obtained from the flight schedule 162, respectively. As another example, the preferences selected for the delay duration factor may be based on available maintenance resources obtained from the maintenance resources 164.

Referring back to FIG. 2, the flight recommendation module 140 generates the recommended action 150 based at least partially or solely on the disruption severity index value 130 from the disruption severity module 120. For example, in some implementations, the recommended action 150 may be based solely on the disruption severity index value 130. In one implementation, the flight recommendation module 140 may compare the disruption severity index value 130 to a predetermined or dynamically determined threshold, and generate a recommended action 150 for fixing the aircraft before flying the aircraft if the disruption severity index value meets the threshold or generate a recommended action for flying the aircraft before fixing the aircraft if the disruption severity index value does not meet the threshold.

Figure 4:
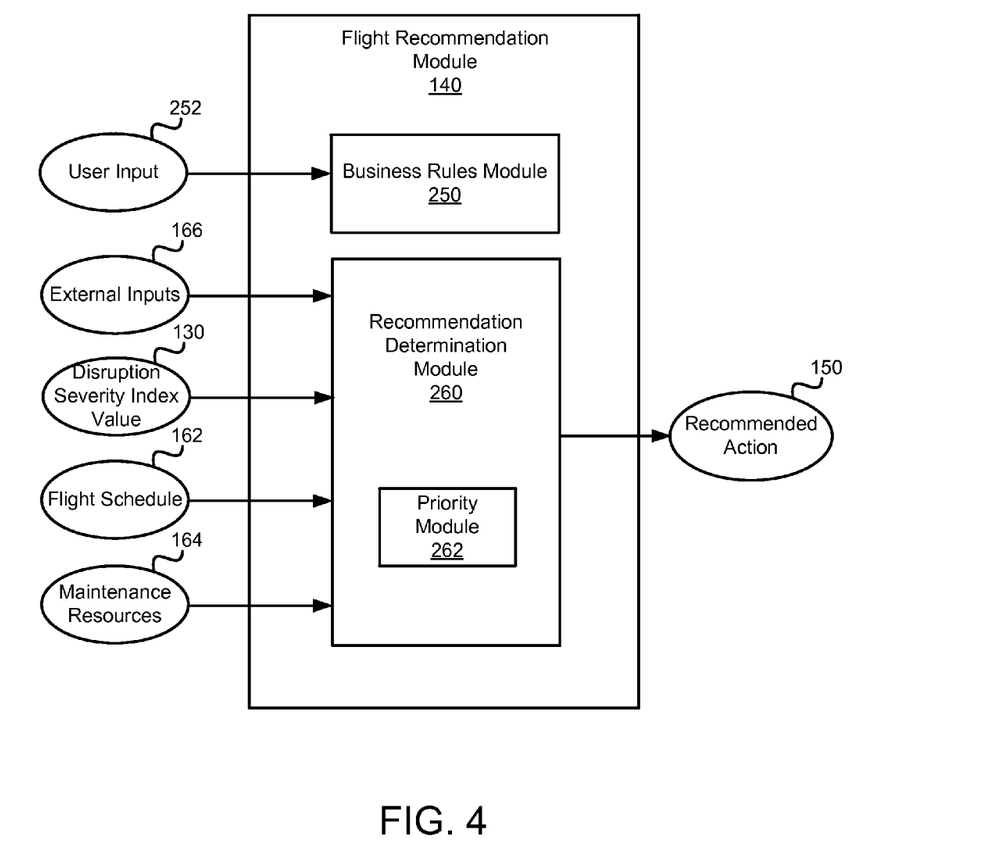
FIG. 4 is a schematic block diagram of a flight recommendation module according to one embodiment.

In yet some implementations, for example, the recommended action 150 is based on the severity index value 130, and at least one of business preferences and other input from the flight schedule 162, maintenance resources 164, and external inputs 166. As shown in FIG. 4, the flight recommendation module 140 includes a business rules module 250 according to one embodiment. The business rules module 250 stores or generates one or more business rules that the recommendation determination module 260 may utilize in generating the recommended action 150. The business rules may be inputted by a user as user input 152 in some implementations. In certain implementations, the business rules may be generated by the business rules module 250 based on the user input 152. Generally, the business rules embody the preferences of a service provider regarding how to handle unscheduled maintenance events in view of the operational aspects of running an airline. For example, one operator might choose to defer maintenance, if possible, in order to minimize flight schedule delay impacts on the airline's passengers, and then perform the repairs at the earliest available time within a deferral allowance (e.g., time period). Another operator might also choose to take the same deferral, but instead fly the airplane for the full length of the deferral allowance before making the repair. The recommendation determination module 260 may be configured to apply the business rules received from the business rules module 250 for generating the recommended action 150.

In some implementations, the recommendation determination module 260 relies on inputs in place of or in addition to the business rules for generating the recommended action 150. In one implementation, the recommendation determination module 260 utilizes real-time data from the current flight schedule 162 to determine if deferring the maintenance for the unscheduled maintenance event is desirable. For example, deferring the maintenance can be based on the present location of the aircraft, the destinations of future flights, and/or availability of unscheduled back-up aircraft obtained from the current flight schedule 162. In one specific implementation, if the airplane is scheduled to fly a high priority (e.g., high revenue-generating) flight within the deferral allowance, then delaying repair actions until the aircraft has either completed the high priority flight or when another aircraft can be shifted to cover the high priority flight.

Similarly, in addition or alternative to business rules and real-time flight schedule data, the recommendation determination module 260 may utilize real-time data from current maintenance resources 164 to determine if deferring the maintenance for the unscheduled maintenance event is desirable. For example, deferring the maintenance can be based on the maintenance capabilities (e.g., manpower, repair facilities, spare part inventory, etc.) of the current or upcoming landing stations. According to one implementation, the maintenance of an unscheduled maintenance event is deferred until the completion of a future flight and arrival of the aircraft at a landing station that has better maintenance capabilities than a present or intermediate landing station. In this manner, deferring the maintenance, although prolonging the fixing of a fault, provides more efficient management of the overall operations of the service provider. Deferrals of this type can occur when an aircraft lands at a station where the operator does not have maintenance capabilities beyond standard servicing, such as refueling and loading passengers. If the fault is not a flight-critical item that would call for a repair before permitting the aircraft to fly again, a deferral of the repair may be initiated so the aircraft can continue on its scheduled route where it will eventually land at a station with appropriate maintenance capabilities. Deferrals can also occur at airports that although have sufficient capabilities, may be servicing other simultaneously occurring unscheduled maintenance events in progress, which can occupy all of the available resources. In this latter case, the aircraft landing station would be considered to have capacity limitations instead of capability limitations. With the allowance for a deferral, passengers may continue to be transported to desired destination, and aircraft may be moved to other airports or landing stations where sufficient maintenance capability and capacity may be available. In either case, the deferral of a repair prevents an unscheduled maintenance event from impacting the passenger experience and enables the unplanned event to be transitioned into a planned event for some time in the future.

In addition or alternative to business rules, and real-time flight and maintenance resource data, the recommendation determination module 260 may utilize external inputs 166 from external data modules 60 or databases to determine if deferring the maintenance for the unscheduled maintenance event is desirable. In one implementation, the external input 166 includes historical disruption severity index values for given types of unscheduled maintenance events. The recommendation determination module 260 can be configured to compare the disruption severity index value 130 of a current unscheduled maintenance event to historical disruption severity index values of similar unscheduled maintenance events from the past. In some implementations, the current disruption severity index value 130 alone will not warrant immediately fixing the current unscheduled maintenance event, but if the current disruption severity index value is a certain amount higher than the historical disruption severity index values, decision support may be provided that triggers an immediate resolution of the current unscheduled maintenance event. In contrast, the current disruption severity index value 130 being a certain amount lower than the historical disruption severity index values may provide the decision support that results in a delay of the resolution of the current unscheduled maintenance event.

According to another implementation, the external inputs 166 may include data from one or more accessible databases. For example, in one implementation, the external inputs 166 may be historical maintenance delay risk calculations that represent the historical risks of delaying the resolution of maintenance events. The higher the risks associated with delaying the resolution of a maintenance event, the less likely the recommendation determination module 260 is to generate a recommended action 150 delaying the maintenance provided there is adequate maintenance capacity at the current location of the aircraft. In another implementation, the external inputs 166 include maintenance manual AOG requirements for given unscheduled maintenance events. According to yet other implementations, the external inputs 166 include historical information regarding the effectiveness of the resolution of past unscheduled maintenance events, and the specific components or maintenance procedures used to execute the resolution. In some implementations, the external inputs 166 may include information regarding the minimum operational components necessary for flying an aircraft. For example, the recommendation determination module 260 may consult maintenance information to determine the historical fixes for a similar fault, and determine that the most likely repair for the fault will take a first amount of time. The given amount of time would then be used as the input for the expected delay time. Similarly, and in conjunction with the previous example, the recommendation determination module 260 may consult historic schedule interruption data related to the specific fault, and find that on average the fault causes flight schedule delays that total a second amount of time greater than the first amount of time. In this case the input for the delay time would be the worst possible case associated with the second amount of time, as opposed to the first amount of time.

According to some embodiments, the recommendation determination module 260 may include a priority module 262 that is configured to prioritize the timing of the resolution or fixing of multiple unscheduled maintenance events for multiple aircraft in view of maintenance resources at a landing station. Generally, the priority module 262 compares the disruption severity index value 130 for multiple unscheduled maintenance events, and the estimated time for resolving the events, then priorities the fixing of the events based on the overall impact on the operations of the service provider. For example, although one aircraft may have an unscheduled maintenance event with a relatively high disruption severity index value 130, which might suggest immediate resolution of the event, if the time to resolve the event is high enough, the priority module 262 may recommend resolving unscheduled maintenance events with relatively low disruption severity index values on other aircraft first because it is more efficient and cost-effective to focus maintenance resources on getting multiple aircraft flying now, as opposed to getting a single aircraft flying at the expense of delaying the flying of multiple aircraft. The prioritization of multiple unscheduled maintenance events by the priority module 262 can be a factor in generating the recommended action 150.

Figure 5:
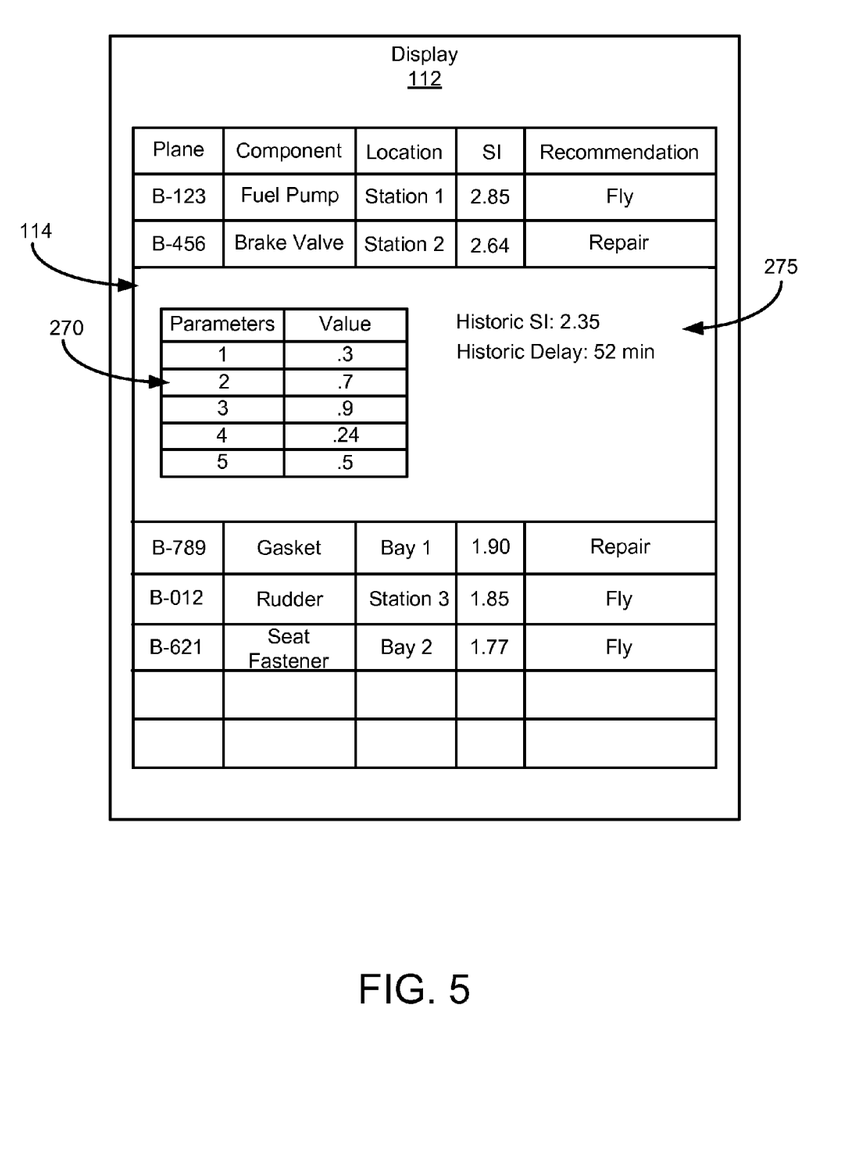
FIG. 5 is a schematic block diagram of a display according to one embodiment.

Referring to FIG. 5, in one embodiment, the display 112 may include a field 114 that displays multiple unscheduled maintenance events and associated information. For example, the field 114 may display the data 270 forming the calculation of the disruption severity index value 130 for each unscheduled maintenance event and historical data 275 associated with each unscheduled maintenance event. Additionally, the disruption severity index value 130 and the recommended action 150 may be displayed in the field 114. The field 114 may also display the aircraft and the location of the aircraft. Further, the field 114 may also include summary information and hyperlinks to the supporting maintenance data sources. For example, the field 114 may include information that indicates the most likely repair for the specific fault, as well as information to indicate both the maintenance requirements and operational restrictions that could be triggered by a repair action deferral should the component be on the minimum essential component list of an aircraft. Generally, the field 114 includes summary information to quickly provide decision support for an operator. In some specific implementations, the field 114 includes hyperlinks to actual information sources so that the operator can access more detailed information if desired.

Figure 6:
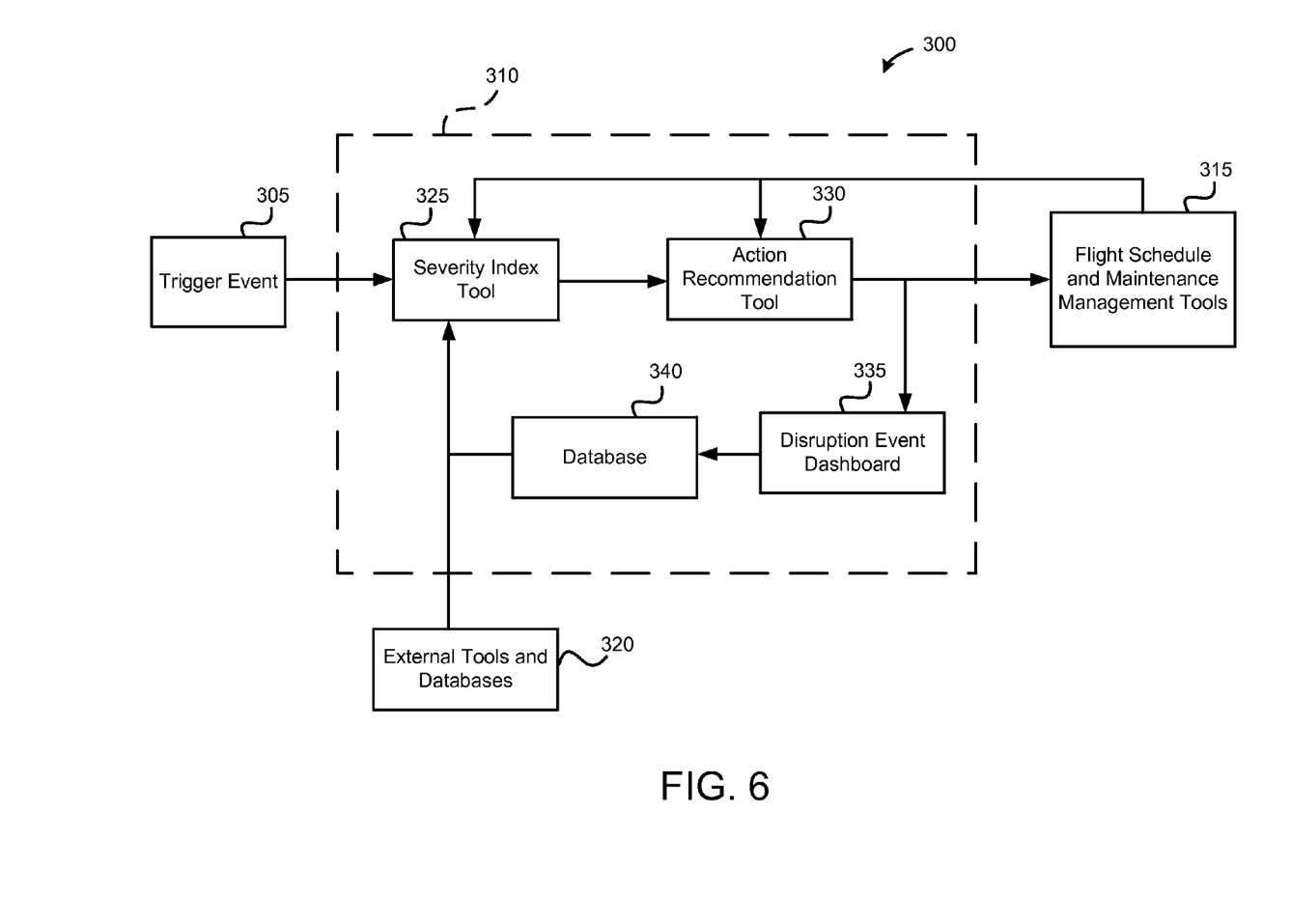
FIG. 6 is a schematic flow diagram of an unscheduled maintenance event management system for aircraft according to one embodiment.

Referring to FIG. 6, an unscheduled maintenance event management system 300 is shown. The system 300 is receptive to a trigger event 305, which is associated with an unscheduled maintenance event being triggered by a fault in an aircraft. The trigger event 305 is received by a disruption severity and fix-or-fly recommendation tool 310. The tool 310 recommends fixing an aircraft or flying the aircraft to flight schedule and maintenance management tools 315, which change flight and maintenance schedules accordingly. For example, if the tool 310 recommends delaying an aircraft to take care of (e.g., repair) an unscheduled maintenance event, then the flight schedule and maintenance management tools 315 adjust the flight schedule by delaying, cancelling, or modifying future flights of the aircraft. Additionally, the tools 315 may adjust the maintenance schedule if the unscheduled maintenance event was scheduled for the future and if any scheduled maintenance events were performed early to take advantage of the unscheduled downtime of the aircraft.

The disruption severity and fix-or-fly recommendation tool 310 includes a severity index tool 325 and an action recommendation tool 330. The severity index tool 325 calculates a disruption severity index value for the trigger event 305 based on real-time data from the flight schedule and maintenance management tools 315, data from external tools and databases 320 that are external to the tool 310, and/or data from a database 340 forming part of the tool 310. The action recommendation tool 330 recommends to the tools 315 to fly the aircraft before fixing the trigger event 305 or fix the trigger event 305 before flying the aircraft. The fix-or-fly recommendation from the tool 330 can be based on real-time flight schedule and maintenance data from the tools 315, the disruption severity index value from the severity index tool 325, and/or data from the external tools and databases 320. Furthermore, the fix-or-fly recommendation can be displayed on a disruption event dashboard 335 accessible by a user. Additionally, the fix-or-fly recommendation and/or other information regarding the management of the current trigger event 305 can be stored in the database 340 for future use.

Figure 7:
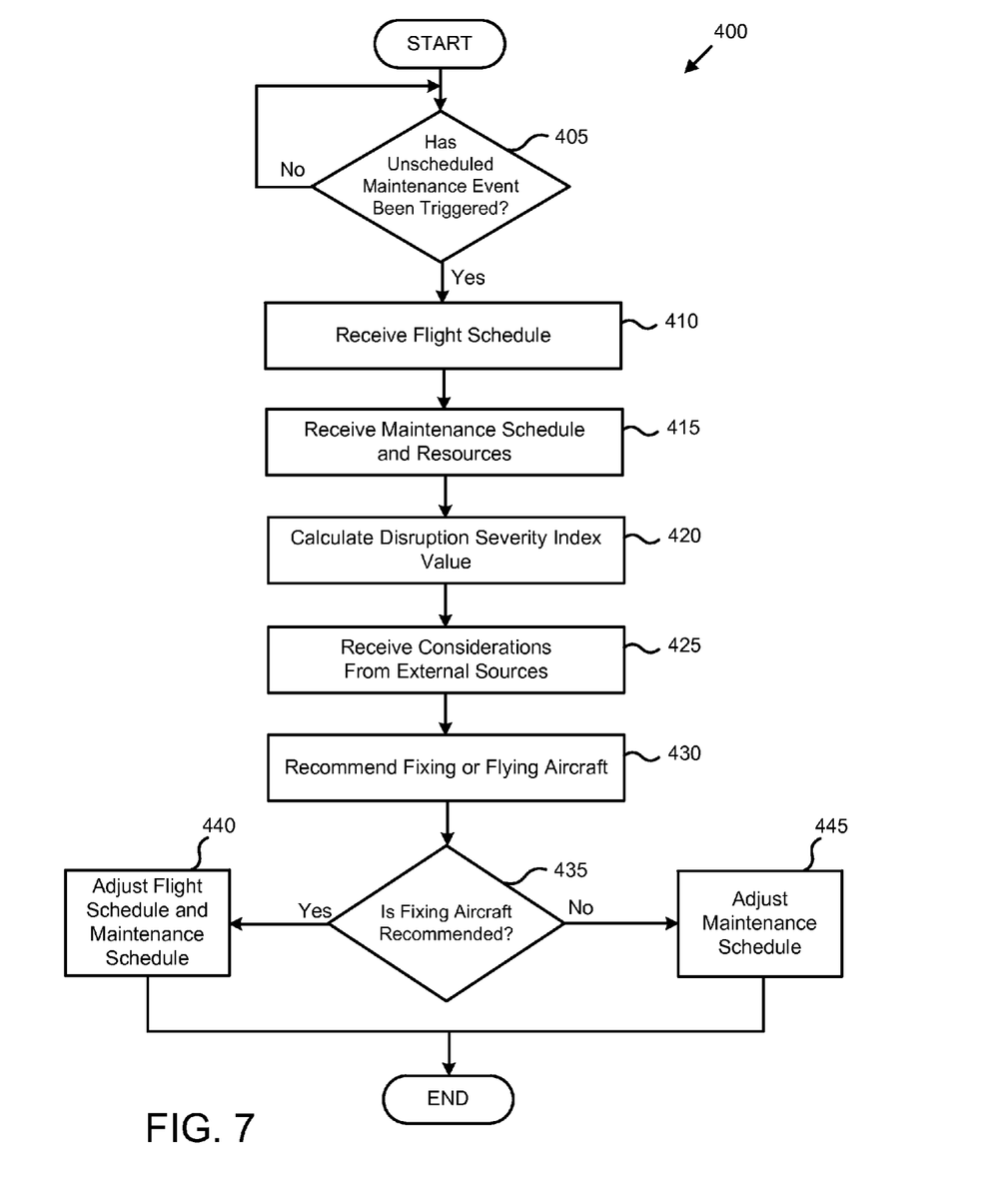
FIG. 7 is a schematic flow diagram of a method for managing unscheduled maintenance events on aircraft according to one embodiment.

Referring to FIG. 7, one embodiment of a method 400 for managing unscheduled maintenance events includes determining at 405 whether an unscheduled maintenance event has been triggered. If no unscheduled maintenance event has been triggered, then the loop repeats itself until an event has been triggered. Once an unscheduled maintenance event has been triggered at 405, the method 400 proceeds to receive flight schedule information at 410 and maintenance schedule and resources at 415. The method 400 then calculates a disruption severity index value at 420. Optionally, the method 400 may receive considerations from external sources at 425, and recommend fixing the unscheduled maintenance event or flying an aircraft without fixing the event at 430 based on the disruption severity index value, external source considerations, and the flight schedule and maintenance schedule/resources received at 410, 415, respectively. The method 400 includes a determination at 435 whether fixing the aircraft has been recommended. If fixing the aircraft has been recommended at 435, then the method 400 adjusts flight and maintenance schedules at 440. However, if flying the aircraft has been recommended at 435, then the method 400 adjusts maintenance schedules at 445 to reflect the delayed maintenance event.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive.

What is claimed is:

1. A system, comprising:
an aircraft that triggers an unscheduled maintenance event;
a data network that receives the unscheduled maintenance event from the aircraft;
a disruption severity module that receives the unscheduled maintenance event from the data network, the disruption severity module configured to calculate a disruption severity index value associated with the unscheduled maintenance event of the aircraft, the disruption severity index value being calculated based on a plurality of flight operation factors affected by the unscheduled maintenance event; and
a flight recommendation module configured to recommend one of resolving the unscheduled maintenance event of the aircraft before a subsequent flight of the aircraft or flying the aircraft without resolving the unscheduled maintenance event of the aircraft based on the disruption severity index value;
wherein each of the plurality of flight operation factors comprises a selected one of at least two parameters, each parameter being associated with a different selection index value, and wherein the disruption severity index value comprises an aggregation of selection index values of selected parameters;
wherein the plurality of flight operation factors comprises a delay duration factor.

2. The system of claim 1, wherein the selection index values for the at least two parameters of at least one flight operation factor are determined based on predetermined business rules.

3. The system of claim 1, wherein the selected one of the at least two parameters of at least one flight operation factor is selected based on historical data for at least one previous unscheduled maintenance event corresponding with the unscheduled maintenance event.

4. The system of claim 1, wherein the selected one of the at least two parameters of the at least one flight operation factor is selected based on real-time data received from an aircraft flight schedule module.

5. The system of claim 1, wherein the selected one of the at least two parameters of the at least one flight operation factor is selected based on real-time data received from a maintenance management module.

6. The system of claim 1, wherein the selected one of the at least two parameters of the at least one flight operation factor is selected based on real-time data received from external data sources.

7. The system of claim 1, wherein the plurality of flight operation factors comprises a type-of-delay factor.

8. The system of claim 7, wherein the at least two parameters of the type-of-delay factor comprises an at-gate delay, a return-to-gate delay, and an in-flight diversion delay.

9. The system of claim 8, wherein the at-gate delay is associated with a first selection index value, the return-to-gate delay is associated with a second selection index value greater than the first selection index value, and the in-flight diversion delay is associated with a third selection index value greater than the second selection index value.

10. The system of claim 1, wherein the at least two parameters of the delay duration factor comprise a plurality of different time periods, the selection index value for a shorter time period being lower than the selection index value for a longer time period.

11. The system of claim 1, wherein the plurality of flight operation factors comprises an aircraft-on-ground (AOG)

factor, and wherein the at least two parameters of the AOG factor comprises grounded and flyable.

12. The system of claim 1, wherein the plurality of flight operation factors comprises a missed flight factor.

13. The system of claim 12, wherein the at least two parameters of the missed flight factor comprise missed flights and no missed flights, and wherein the selection index value for missed flights is based on a quantity of missed flights multiplied by an index value constant.

14. The system of claim 1, wherein the plurality of flight operation factors comprises an aircraft ferry factor.

15. The system of claim 1, wherein the plurality of flight operation factors comprises at least one of a load factor, missed flights value factor, hub factor, missed connections percentage factor, network delay factor, time-of-day factor, and pilot/crew delay factor.

16. The system of claim 1, wherein the flight recommendation module recommends one of resolving the unscheduled maintenance event of the aircraft before a subsequent flight of the aircraft or flying the aircraft without resolving the unscheduled maintenance event of the aircraft based on real-time data received from an aircraft flight schedule module.

17. The system of claim 16, wherein the real-time data comprises data associated with a current location of the aircraft with the unscheduled maintenance.

18. The system of claim 16, wherein the real-time data comprises data associated with a time-of-day of a scheduled flight.

19. The system of claim 1, wherein the flight recommendation module recommends one of resolving the unscheduled maintenance event of the aircraft before a subsequent flight of the aircraft or flying the aircraft without resolving the unscheduled maintenance event of the aircraft based on real-time data received from a maintenance management module.

20. The system of claim 19, wherein the real-time data comprises data associated with at least one scheduled maintenance event of the aircraft.

21. The system of claim 19, wherein the real-time data comprises data associated with maintenance capability at one or more aircraft landing stations.

22. The system of claim 1, wherein the flight recommendation module recommends one of resolving the unscheduled maintenance event of the aircraft before a subsequent flight of the aircraft or flying the aircraft without resolving the unscheduled maintenance event of the aircraft based on a predicted effectiveness of a resolution of the unscheduled maintenance event.

23. A system, comprising:
an aircraft that triggers an unscheduled maintenance event;
a data network that receives the unscheduled maintenance event from the aircraft;
a disruption severity module that receives the unscheduled maintenance event from the data network, the disruption severity module configured to calculate a disruption severity index value associated with an unscheduled maintenance event of an aircraft, the disruption severity index value being calculated based on a plurality of flight operation factors affected by the unscheduled maintenance event; and
a flight recommendation module configured to recommend one of resolving the unscheduled maintenance event of the aircraft before a subsequent flight of the aircraft or flying the aircraft without resolving the unscheduled maintenance event of the aircraft based on the disruption severity index value;
wherein the flight recommendation module recommends one of resolving the unscheduled maintenance event of the aircraft before a subsequent flight of the aircraft or flying the aircraft without resolving the unscheduled maintenance event of the aircraft based on a comparison between the disruption severity index value associated with the unscheduled maintenance event and a historical disruption severity index value associated with previous unscheduled maintenance events at least similar to the unscheduled maintenance event.

24. The system of claim 1, wherein the flight recommendation module comprises a priority module configured to prioritize timing of resolving multiple unscheduled maintenance events for multiple aircraft based at least partially on disruption severity index values associated with the unscheduled maintenance events and impacts of resolving each multiple unscheduled maintenance event on a flight schedule.

25. The system of claim 1, further comprising a display module configured to display data associated with the unscheduled maintenance event, wherein the data comprises at least one of the disruption severity index and a recommendation to either resolve the unscheduled maintenance event before a subsequent flight of the aircraft or fly the aircraft without resolving the unscheduled maintenance event.

26. The system of claim 1, wherein the flight recommendation module recommends one of resolving the unscheduled maintenance event of the aircraft before a subsequent flight of the aircraft or flying the aircraft without resolving the unscheduled maintenance event of the aircraft based on future locations of the aircraft.

27. A system for managing unscheduled maintenance events of aircraft, comprising:
a flight schedule module configured to monitor current locations and flight schedules of aircraft;
a maintenance module configured to monitor current maintenance schedules of aircraft and maintenance capabilities of aircraft landing stations;
a data network;
an aircraft that triggers an unscheduled maintenance event and communicates the unscheduled maintenance event to the data network; and
a disruption control module in data receiving communication with the flight schedule module to receive over the data network a current location and flight schedule of the aircraft, with the maintenance module to receive over the data network a current maintenance schedule of the aircraft and maintenance capabilities of aircraft landing stations, and in data receiving communication with the aircraft to receive over the data network the unscheduled maintenance event, the disruption control module configured to calculate a disruption severity index value of the unscheduled maintenance event of the aircraft, and to set a fix-or-fly status of the aircraft based on the disruption severity index, the current location and flight schedule of the aircraft, the current maintenance schedule of the aircraft, and the maintenance capabilities of aircraft landing stations on the flight schedule of the aircraft;
wherein the disruption control module sets the fix-or-fly status of the aircraft based also on a predicted effectiveness of a resolution of the unscheduled maintenance event.

28. A method for managing unscheduled maintenance events of aircraft, comprising:
detecting a fault on an aircraft, the fault being detected by the aircraft;
triggering an unscheduled maintenance event on the aircraft based on the fault;

communicating the unscheduled maintenance event from the aircraft to a data network;
receiving at a disruption severity module a current flight schedule for the aircraft;
receiving at the disruption severity module a current maintenance schedule for the aircraft;
receiving at the disruption severity module the unscheduled maintenance event from the data network and current maintenance capabilities of aircraft landing stations on the current flight schedule;
calculating a disruption severity index value associated with the unscheduled maintenance event of the aircraft based on a plurality of flight operation factors affected by the unscheduled maintenance event;
recommending fixing the unscheduled maintenance event before flying the aircraft or flying the aircraft before fixing the unscheduled maintenance event based on the disruption severity index value, the current flight schedule for the aircraft, the current maintenance schedule for the aircraft, and the current maintenance capabilities of the aircraft landing stations on the current flight schedule; and
adjusting at least one of the current flight schedule and current maintenance schedule if fixing the unscheduled maintenance event before flying the aircraft is recommended.

29. The method of claim 28, wherein the current flight schedule is adjusted if fixing the unscheduled maintenance event before flying the aircraft is recommended.

30. The method of claim 28, wherein the current maintenance schedule is adjusted if flying the aircraft before fixing the unscheduled maintenance event is recommended.

* * * * *